(12) United States Patent
Hagenbrock et al.

(10) Patent No.: US 7,743,587 B2
(45) Date of Patent: Jun. 29, 2010

(54) METHOD FOR THE MANUFACTURE OF MIXED PACKAGES AND DEVICE FOR CARRYING OUT THE METHOD

(75) Inventors: Werner Hagenbrock, Bad Feilnbach (DE); Joachim Junghans, Frankfurt (DE)

(73) Assignee: KHS AG, Dortmund (DE)

( * ) Notice: Subject to any disclaimer, the term of this patent is extended or adjusted under 35 U.S.C. 154(b) by 75 days.

(21) Appl. No.: 12/035,688

(22) Filed: Feb. 22, 2008

(65) Prior Publication Data

US 2009/0049801 A1 Feb. 26, 2009

Related U.S. Application Data

(63) Continuation of application No. PCT/EP2006/008270, filed on Aug. 23, 2006.

(30) Foreign Application Priority Data

Aug. 23, 2005 (DE) ........................ 10 2005 039 842

(51) Int. Cl.
  *B65B 35/30* (2006.01)
(52) U.S. Cl. .............................. 53/445; 53/443; 53/171
(58) Field of Classification Search .................. 53/445, 53/443, 448, 171, 397, 398
  See application file for complete search history.

(56) References Cited

U.S. PATENT DOCUMENTS 3,934,920 A * 1/1976 Rowekamp ................. 294/87.1
4,051,652 A * 10/1977 Hirano et al. ................. 57/270
4,164,296 A   8/1979 Trees
6,058,679 A * 5/2000 Ziegler et al. ................. 53/448
6,293,393 B1* 9/2001 Clay .......................... 206/217
7,143,567 B2* 12/2006 Omo et al. .................... 53/443
7,451,584 B2* 11/2008 Schateikis et al. ............. 53/443

FOREIGN PATENT DOCUMENTS

DE         44 33 361      3/1996
DE    10 2004 062 958.7   7/2006
EP          0 239 547      9/1987

* cited by examiner

*Primary Examiner*—Sameh H. Tawfik
(74) *Attorney, Agent, or Firm*—Nils H. Ljungman & Associates

(57) ABSTRACT

Method for the manufacture of mixed packages and device for carrying out said method. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 8 Drawing Sheets

METHOD FOR THE MANUFACTURE OF MIXED PACKAGES AND DEVICE FOR CARRYING OUT THE METHOD

CONTINUING APPLICATION DATA

This application is a Continuation-In-Part application of International Patent Application No. PCT/EP2006/008270, filed on Aug. 23, 2006, which claims priority from Federal Republic of Germany Patent Application No. 10 2005 039 842.1, filed on Aug. 23, 2005. International Patent Application No. PCT/EP2006/008270 was pending as of the filing date of this application. The United States was an elected state in International Patent Application No. PCT/EP2006/008270.

BACKGROUND

1. Technical Field

This application relates to a method for the manufacture of mixed packages and device for carrying out the method.

2. Background Information

Containers or packaging units, such as, for example, bottles, cartons or other packaging formats etc. filled with a product may be packed in external packages such as, for example, cartons, trays, beverage cases etc. and the marketing of the products in this form.

The containers in a package of this type generally all contain one and the same product, which can be, for example, a beverage of a certain type or variety (for example exclusively juice or soft drinks or beer etc.) and/or of one and the same flavor. Packages that are made up of containers or other packaging units that contain one and the same product are designated "single-variety packages" below.

The retail trade and/or the final consumer often demand packages that contain more than one variety and are referred to as "mixed packages" below, in which case they contain, in their external packaging, packaging units or containers that contain different products, such as, for example, containers with beverages (e.g. soft drinks) of different varieties and/or different flavors (e.g. cola beverages and fruit-flavored soft drinks etc.).

Mixed packages of this type can also include, for example, trays that hold animal food packaged in cans, in which case the tray in question can contain cans of different flavors.

A device of this type was described in DE 10 2004 062 958.7. This application related to a device in which containers are taken from single-variety packages and are then assembled into mixed packages with additional containers of other varieties to form packages that contain more than one variety.

The specific focus of DE 10 2004 062 958 is the description of a device for the unpacking of single-variety packages.

In the framework of that application, the function of the assembling of different varieties or mixing of the containers of different varieties is described only in general terms and with a different emphasis, which is to show that the assembling of the containers with different varieties could be done, for example, by means of a controlled pick/place or gripper arrangement.

OBJECT OR OBJECTS

The object of at least one embodiment is to make available a device and a method for the assembly of mixed packages, whereby the assembly of mixed packages with essentially any desired quantities of the individual varieties and/or virtually any desired three-dimensional arrangement of containers of the individual varieties within the mixed package becomes possible.

SUMMARY

To accomplish this object, the application teaches a method for the formation of mixed packages from single-variety packages, each with containers or similar packaging units contained in an external package, whereby the single-variety packages are transported by means of at least one conveyor to an unpacker, and whereby those packages which contain only one and the same product are located on each conveyor. After the unpacking, the containers are located on at least one buffer line and are then assembled into mixed packages. The containers of different varieties which form a mixed package are assembled either in a plurality of process steps, whereby one process step is performed for each occupied buffer line and whereby, in each process step, containers are taken from only one buffer line or are assembled in a single process step, whereby the containers that form a mixed package are taken simultaneously from a plurality of buffer lines. The application also teaches a device for the formation of mixed packages from single-variety packages, each with containers or similar packaging units contained in an external package. In the device, the single-variety packages are transported by means of at least one conveyor to an unpacker, whereby those packages which contain only one and the same product are located on each conveyor. After the unpacking, the containers are located on at least one buffer line and are then assembled into mixed packages. The device has a packing head that comprises at least one module, which packing head is realized so that it removes containers for at least one mixed package simultaneously from a plurality of buffer lines in a single process step, or that it assembles the containers for at least one mixed package in a plurality of process steps, whereby in each process step only containers of one variety are removed or set up. Further possible embodiments of the method and device are disclosed herein.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The embodiments are explained in greater detail below with reference to the accompanying illustrations, in which.

DESCRIPTION OF EMBODIMENT OR EMBODIMENTS

Figure 1:
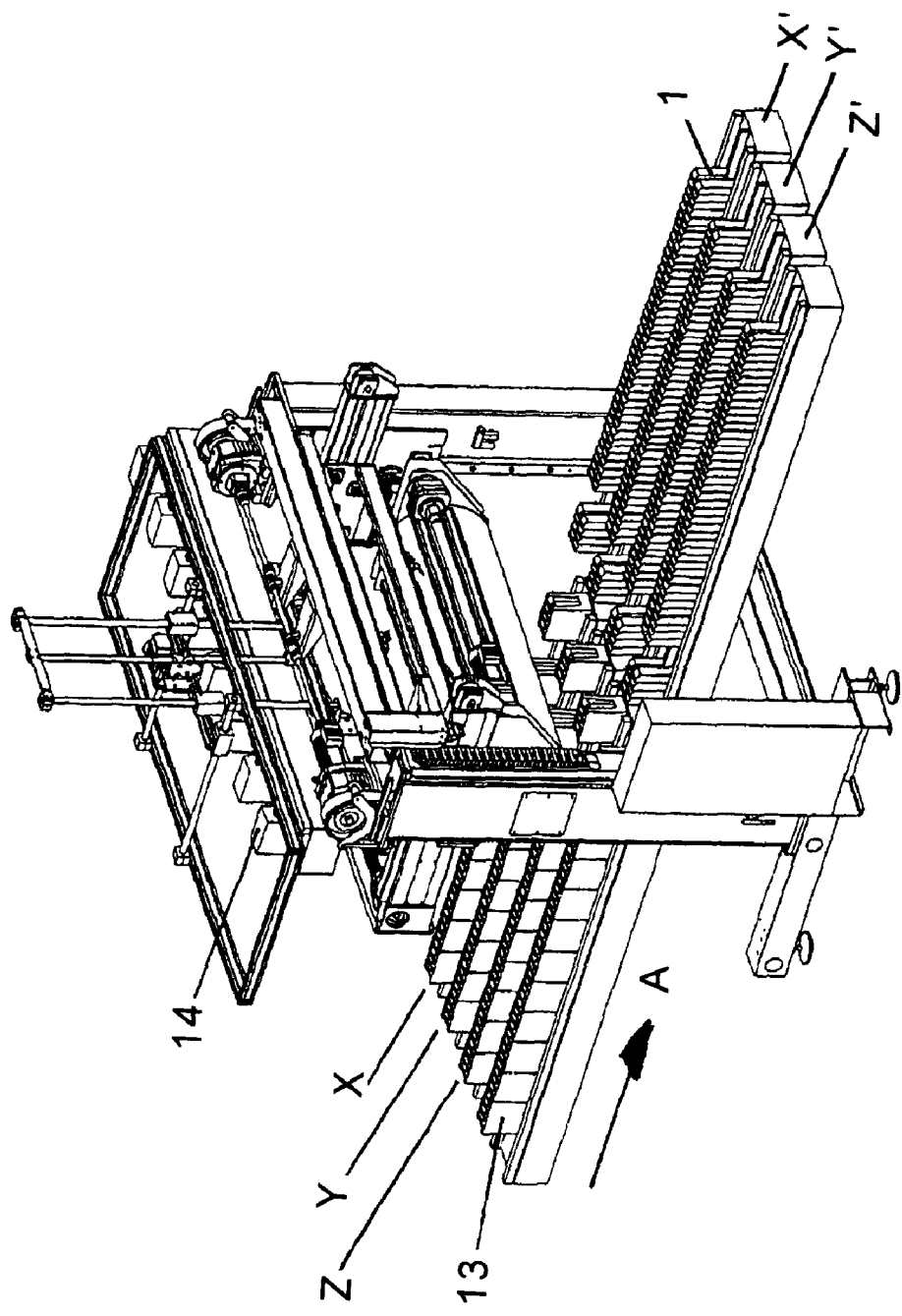
FIG. 1 shows a container unpacker.

The unpacker illustrated in FIG. 1 is used first for the unpacking of containers 1, e.g. the removal of containers in the form of bottles, cartons etc. filled with beverages from packages 13 such as, for example, cartons, trays or beverage cases.

The outer packaging is generally handled during the unpacking so as to minimize or prevent damage to the outer packaging 14 and to transport the outer packaging for reuse at a later time.

Figure 2:
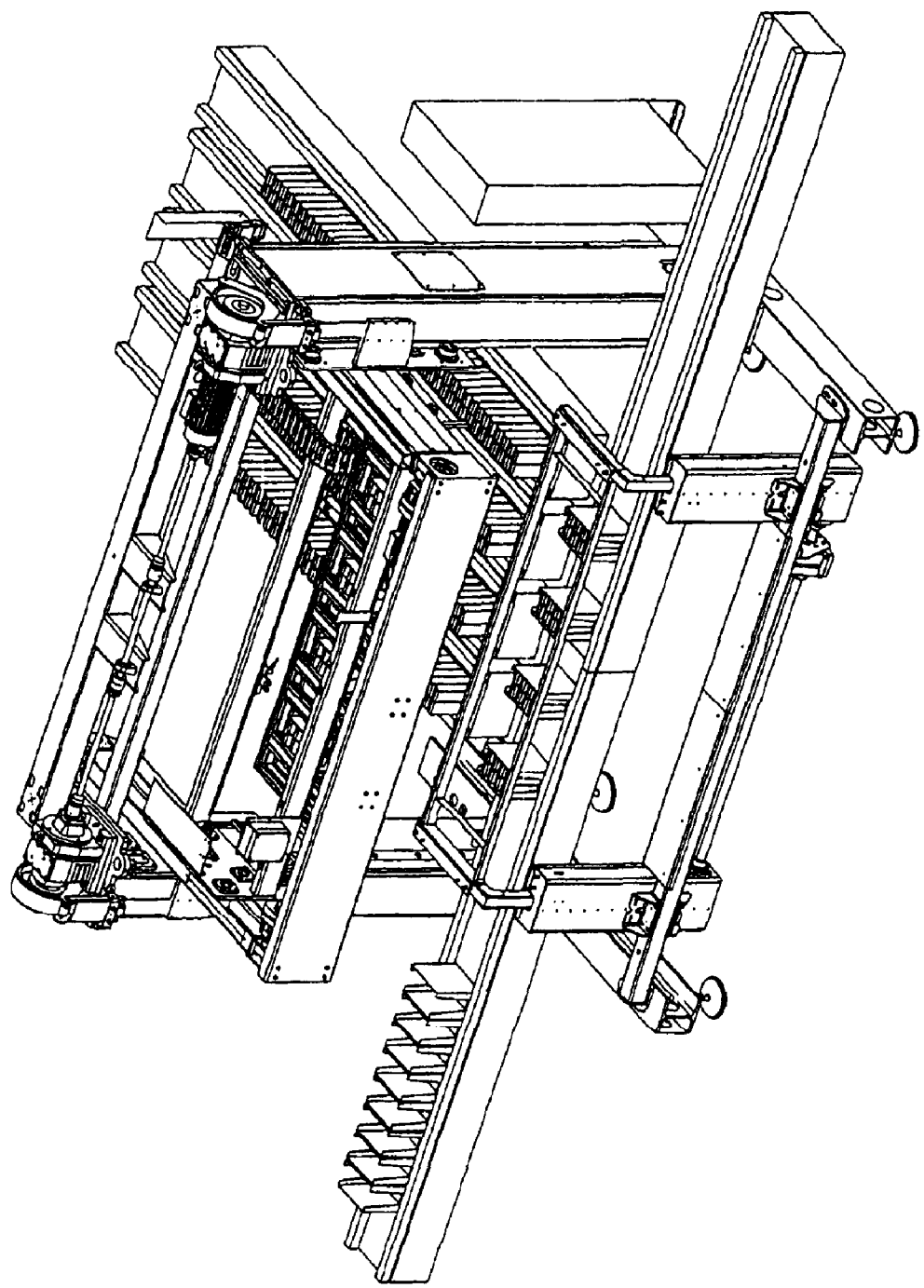
FIG. 2 shows a container packer with a collection and pre-assembly line.
Figure 3:
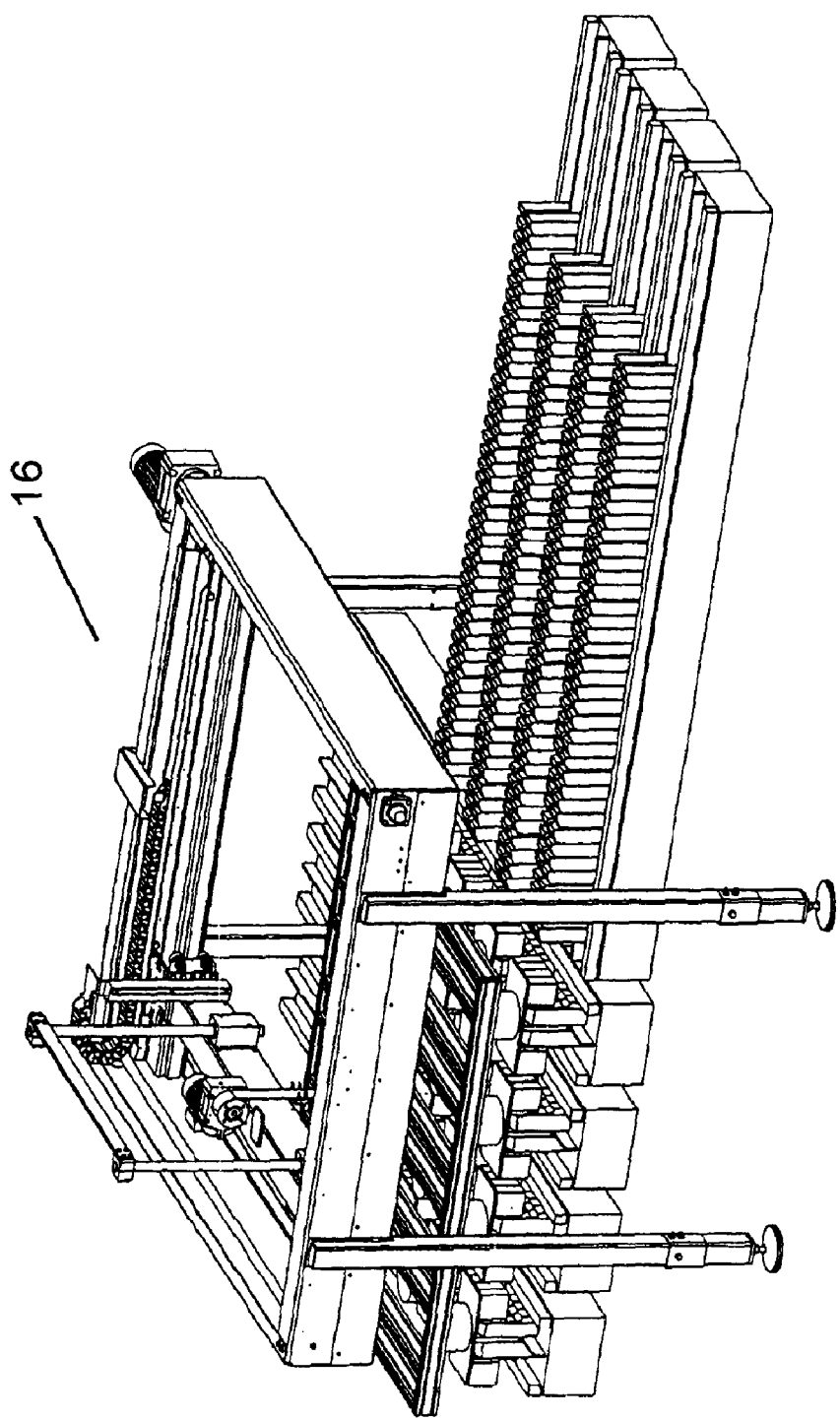
FIG. 3 shows one possible embodiment of an order picking station.

In at least one possible embodiment, the outer packaging 14 may be sent to a packer, such as the one shown in FIG. 2, which packer may receive the groups of containers from the setup section 17 and package the groups of containers in the outer packaging 14 received from the unpacker.

In the embodiment illustrated in FIG. 1, the single-variety packages 13 formed by the outer packaging 14 with the containers 1 are transported each via a conveyor X, Y, Z in the direction indicated by the arrow A (direction of transport).

Each package 13 contains eight containers 1, which are arranged as a group of containers in two rows of four containers each, and are all filled with one and the same product, although the products on conveyor X, Y, Z can be different from those on the other respective conveyors X, Y, Z.

For example, the packages 13 delivered on the conveyor line X each contain eight containers 1 with a soft drink of a first variety (e.g. a cola beverage), the package 13 delivered on the conveyor line Y contains eight containers 1 with a soft drink of a second variety (e.g. a non-cola carbonated beverage of a first flavor) and the package 13 delivered on the conveyor line Z contains eight containers 1 with a soft drink of a third variety (e.g. a non-cola carbonated beverage of a second flavor).

At the unpacker, the containers 1 are removed as an entire group of containers from the packages 13, and specifically without destroying the outer packaging 14.

Each delivery conveyor line X, Y, Z is associated with a respective buffer line X', Y', Z' downstream of the unpacker. The containers 1 of a single variety are each stored for an interim period on these buffer lines. These buffer lines X', Y', Z' can be driven individually or jointly, and transport the containers 1 against a limit stop 15, so that the containers 1 butt up against one another on the buffer lines X', Y', Z'.

The entire plant is designed to repackage the containers 1 in a new configuration into the outer packaging 14 which is empty after the unpacking and can be reused, and namely so that containers 1 with different products are contained in each outer package 14 or in the corresponding mixed package.

It is thereby possible to control the plant so that this combination is identical in all the mixed packages that leave the plant, i.e. each package contains, for example, three containers 1 of the product of the first variety, three containers 1 of the product of the second variety and two containers 1 of the product of the third variety. However, the plant can also be controlled so that the individual mixed packages have a different makeup, for example packages 1 corresponding to the following table.

| Mixed packages | Number of containers with first variety | Number of containers with second variety | Number of containers with third variety |
| --- | --- | --- | --- |
| First package | 3 | 3 | 2 |
| Second package | 1 | 1 | 6 |
| Third package | 5 | 2 | 1 |

It goes without saying that other combinations of mixed packages are possible.

For the repackaging and/or for the manufacture of the mixed packages, the plant also has an order picker or order picking station 16.

This application teaches at least two configurations for the realization of this order picking station 16.

A first configuration thereby makes possible the formation of such mixed packages 19 in which both the composition of the individual varieties in terms of quantity and the spatial positioning of the containers 1 of each variety can be selected as desired.

A second configuration, on the other hand, makes it possible to select the quantitative composition of the individual varieties within the mixed package as desired, whereby the spatial positioning of the containers of one variety is determined essentially by the arrangement of the varieties on the transport lines X, Y, Z.

Compared to the first configuration, the second configuration may have a higher quantitative output.

The first configuration is described in greater detail below.

Figure 4:
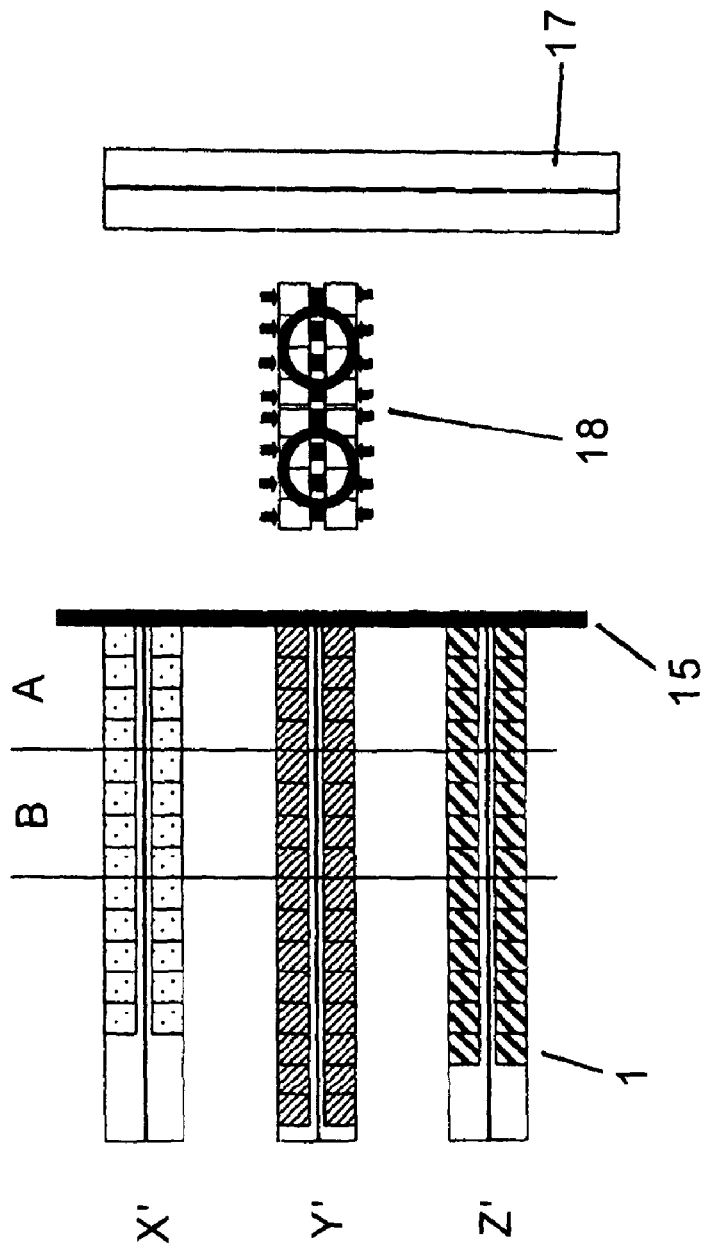
FIGS. 4 and 5 show an overhead view of a first possible embodiment.

FIG. 4 shows the starting situation. The containers 1 were separated by the unpacker from the outside packaging 14 and set up by individual varieties on the buffer lines X', Y', Z'. The containers 1 were positioned by the limit stop 15 and are arranged so that they butt up against one another.

On the setup section 17 there are no containers 1. A packing head 18, which can be equipped, for example, with two modules, each with eight receptacles for each container 1, is in a standby position.

For the sake of clarity, the buffer lines X', Y', Z' are divided into segments A and B, whereby each segment holds eight containers 1, corresponding to the number of receptacles of the module of the packing head 18.

Figure 5:
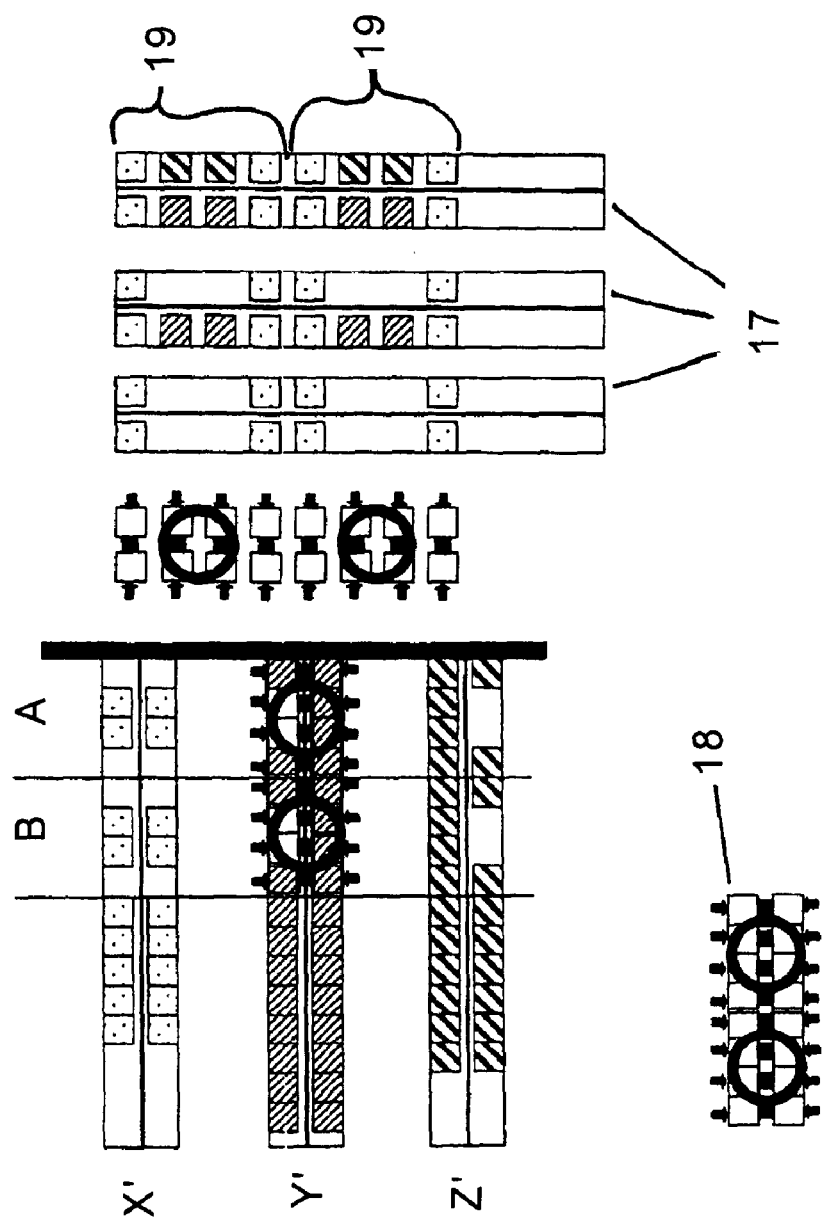

As shown in FIG. 5, with regard to the first configuration, the invention teaches that the mixed packages are assembled in a plurality of steps. For this process, the packing head 18 is first positioned over the containers 1 on a buffer line X', Y', Z' and picks up the desired containers 1 by means of suitable clamping means, such as clamping fingers or grippers. It is thereby of particular importance that the containers 1 are not taken from just any random location on the buffer lines X', Y', Z', but are taken precisely from the spots that correspond to the spatial position of the containers 1 in the mixed packages to be formed.

In the illustrated exemplary embodiment, first the containers 1 located in the corner positions are removed from the buffer line X' from the areas A and B, because these containers are also intended to occupy the corner positions in the mixed package 19. Then the containers 1 removed from the buffer line X' are set down in the correct position on the setup line 17, for which purpose the packing head as a unit executes a 90° rotational movement around its vertical axis.

In at least one embodiment, in the assembly of the mixed packages 19 the individual receptacles for the containers 1—as shown—are moved into a position in which they are separated farther from one another before the containers 1 are set down, to minimize the danger of the containers 1 tipping over during the subsequent insertion of additional containers 1 into the mixed package 19.

To accomplish this spacing of the containers 1 in the setup section 17, in at least one possible embodiment the clamping or gripping devices or receptacles of the packing head 18 can be adjusted in their spacing with respect to one another. As can be seen in FIG. 5, the eight receptacles or clamping or gripping devices of the packing head 18 are divided into two rows of four, or four opposing pairs of receptacles. Upon the packing head 18 being moved into position to retrieve containers 1 from the buffer lines X', Y', Z', the spacing between the four receptacles in each row is decreased and the receptacles are moved next to one another with no space or at least very little space there between. In this manner, the spacing of the receptacles corresponds to the spacing of the containers 1 in the buffer lines X', Y', Z', which containers 1 are pressed up against one another. After retrieval of the appropriate containers 1 and upon movement of the packing head 18 towards the setup section 17, the spacing between the four receptacles in each row is increased and the receptacles are moved apart from one another with some space there between. In this manner, the containers 1 retrieved first are deposited in the setup section 17 with some space there between so that subsequent containers 1 may be placed adjacent the first-retrieved containers 1 with minimized or decreased risk of tipping of the first-retrieved containers 1 upon placement of the subsequent containers 1. The spacing between opposing pairs of the receptacles of the packing head 18 remains unchanged during the operation of the packing head 18, although in at least one embodiment such spacing could also be adjusted if desired to increase or decrease the spacing between opposing containers 1.

In further steps, the packing head 18 removes the missing containers from the buffer lines Y' and Z' and also sets them down in the correct position on the setup line 17, as a result of which the mixed package is completed.

In the illustrated embodiment, one packing head 18 with two modules which each hold eight containers 1 is shown. It goes without saying that different configurations are possible. For example, 3 modules with four or even 10 receptacles each can be provided, and/or four different buffer lines, without thereby going beyond the scope of this invention.

Theoretically, the illustrated exemplary embodiments work step by step. Once the containers 1 for all the mixed packages 19 of a process step have been assembled, the gaps that are created on the buffer lines X', Y', Z' are closed by engaging the drive mechanism, so that the containers on the buffer lines are once again arranged so that the butt up against one another. The mixed packages assembled on the setup line 17 are transported to a packer.

As shown, the mixed packages are assembled in a plurality of process steps. In each process step, containers 1 are removed from only one buffer line X', Y', Z' and set down in the desired position on the setup line 17. The result is that one process step is necessary for each occupied buffer line X', Y', Z'.

Figure 6:
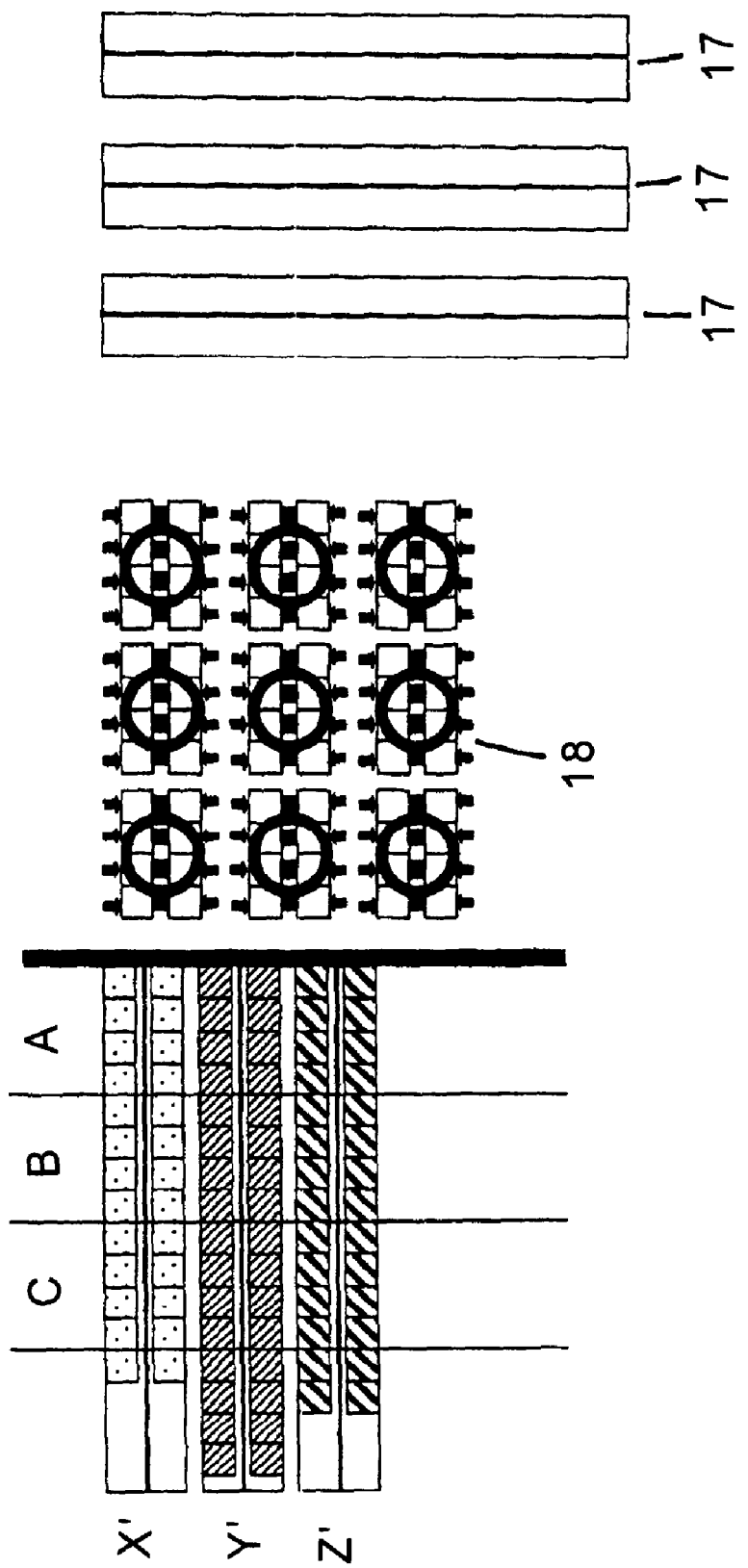
FIGS. 6 and 7 show an overhead view of a second possible embodiment.
Figure 7:
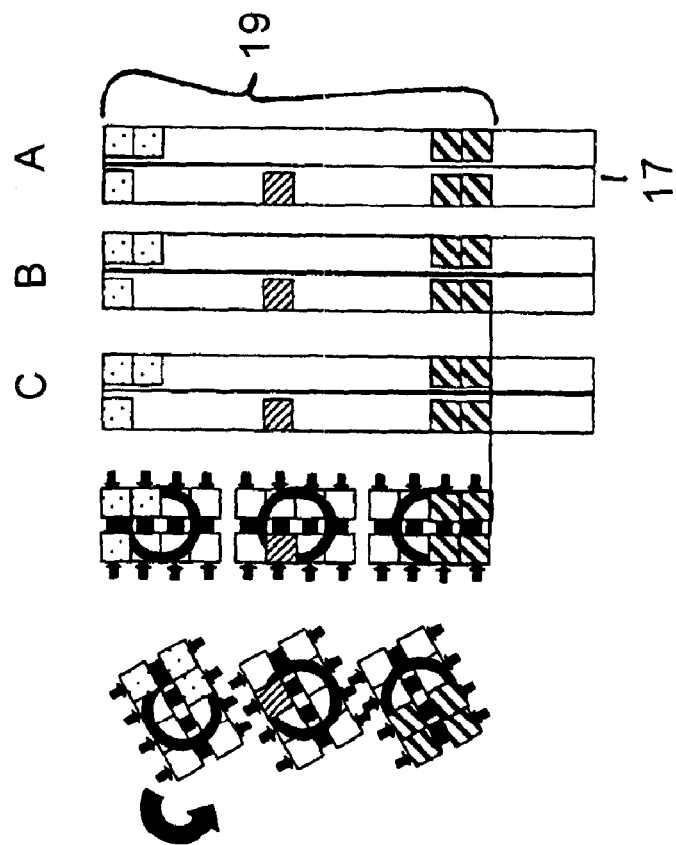
Figure 7:
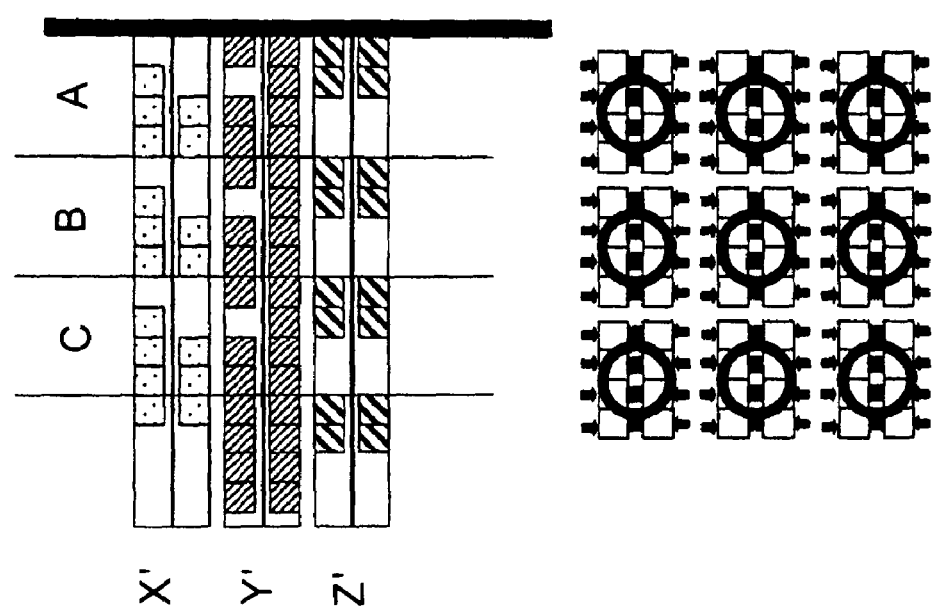

The second exemplary embodiment is illustrated in FIGS. 6 and 7.

As illustrated in FIG. 6, for the second embodiment there are a plurality of setup lines 17, e.g. three. The containers 1 that are to be assembled to form the mixed packages 19 are located butting up against one another on three buffer lines X', Y', Z', for example. For the assembly of the mixed packages 19, a packing head 18 is provided which consists of a plurality of modules, e.g. 3×3 modules, whereby each of these modules has eight receptacles, each of which holds one container 1.

For a device corresponding to the second embodiment, the application teaches that each individual mixed package 19 is assembled in one process cycle. For that purpose, the packing head 18 is first positioned over the buffer lines X', Y', Z', whereupon each of the individual modules picks up certain containers 1.

It is thereby particularly important that during a process step, the containers 1 that are taken simultaneously in a single process step in a column A, B, C from the individual buffer lines X', Y'Z' each form a mixed package. For example, the containers 1 taken from the sections X', A and Y'A and Z'A form the mixed package 19 that is being set up on the setup line 17.

When all the relevant containers 1 have been picked up by the packing head 18, the packing head 18 is positioned over the setup lines 17, whereby the individual modules of the packing head 18 execute a 90° rotational movement around their vertical axis. The containers 1 are then set down on the setup lines 17.

Then both the containers 1 on the buffer lines X', Y', Z' as well as the assembled mixed packages 19 are compacted by activating the drive mechanism. The mixed packages are then transported to a packer.

With regard to the second embodiment, too, there can be different numbers of buffer lines X', Y', Y'Z', modules and setup lines.

Figure 8:
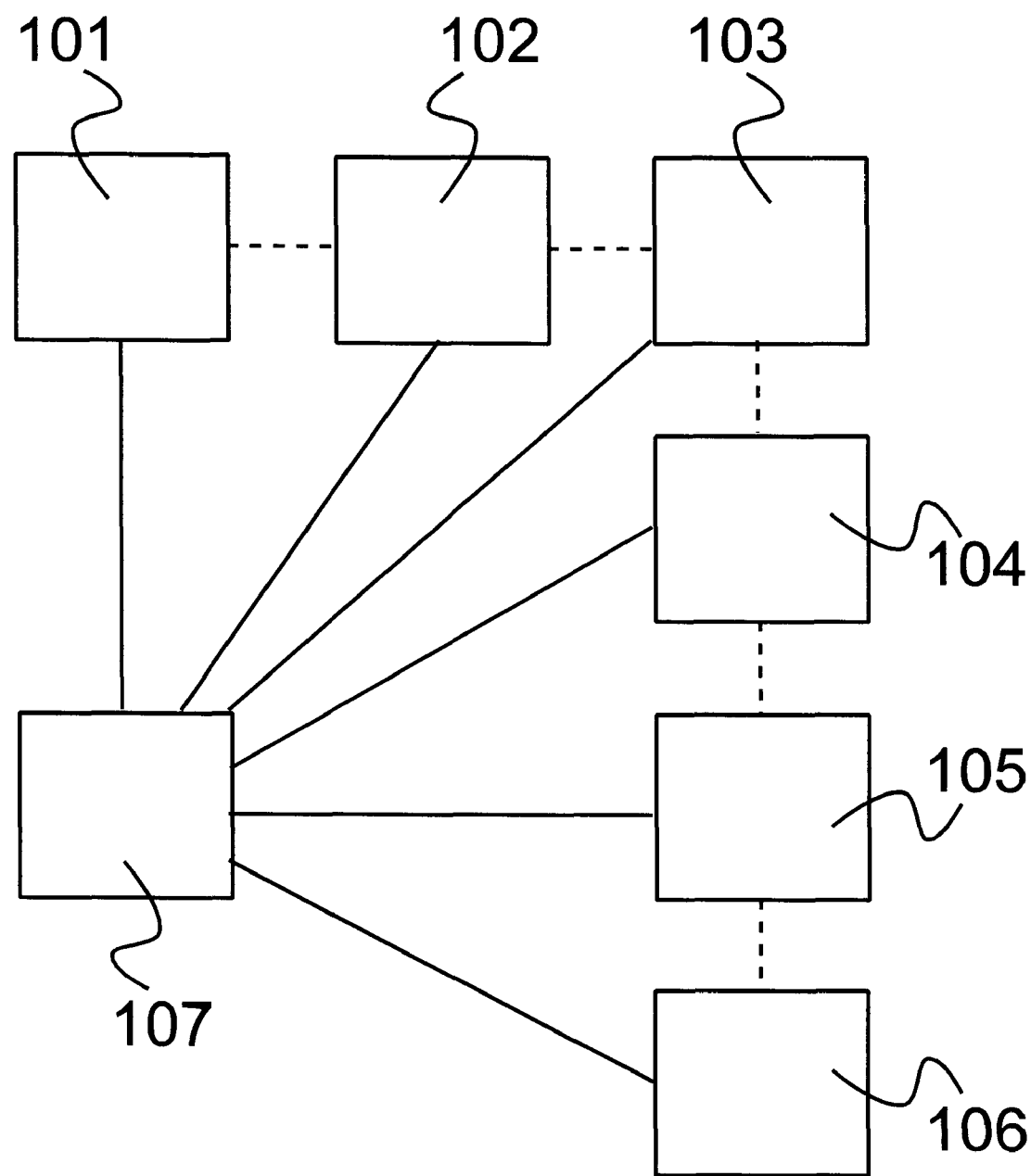
FIG. 8 shows a block diagram of a control system for controlling the packaging process, according to at least one possible embodiment.

FIG. 8 shows a block diagram of a control system 107 for controlling the packaging process, according to at least one possible embodiment. The control system 107 can be a computer control system that controls and monitors the operation of the various stations in the packaging process. The control system 107 may run either automatically according to a program, or may be run manually by an operator who inputs commands into the control system, or may run by a combination of automated commands and manually-input commands. In operation of the packaging system, the control system 107 may first activate drives 101 which are connected to the conveyors X, Y, Z (shown in FIG. 1) to move the packages 13 to an unpacking machine 102. The control system 107 activates the unpacking machine 102 to remove the outer packaging 14 from the packages 13 and move the containers 1 onto the buffer lines X', Y', Z' (shown in FIG. 1). The control system 107 may then activate drives 103 which are connected to the buffer lines X', Y', Z' to move the containers 1 to the limit stop 15 to compact the containers 1 in the buffer lines X', Y', Z'. The drives 103 may be activated either individually or jointly by the control system 107 according to manually-input or automatic commands to permit individual or joint movement of the buffer lines X', Y', Z'. The control system 107 may then activate another drive mechanism 104 which is connected to the packing head 18 to move the packing head 18 back and forth between the buffer lines X', Y', Z' and the setup section 17 (shown in FIGS. 4-7). Depending on the design of the packing head 18 and the desired format of the mixed packages, the control system 107 causes the drive mechanism 104 to move the packing head 18 accordingly to retrieve the appropriate containers 1 to achieve the desired format of the mixed packages in the setup section 17. Upon completion of the mixed groups of containers 1 in the setup section 17, the control system 107 activates drives 105 connected to conveyors of the setup section 17 to compact the mixed groups of containers 1 and move them to a packing machine 106. The packing machine 106 is then activated to pack the mixed groups of containers 1 into packages, such as by using outer packaging 14 received from the unpacking machine 102.

One feature or aspect of an embodiment is believed at the time of the filing of this patent application to possibly reside broadly in a method for the formation of mixed packages 19 from single-variety packages 13, each with containers 1 or similar packaging units contained in an external package 14, whereby the single-variety packages 13 are transported by means of at least one conveyor (X, Y, Z) to an unpacker, and whereby preferably those packages 13 which contain only one and the same product are located on each conveyor (X, Y, Z), and whereby after the unpacking, the containers 1 are located on at least one buffer line (X', Y', Z') and are then assembled into mixed packages 19, characterized in that the containers 1 of different varieties which form a mixed package 19 are assembled either in a plurality of process steps, whereby one process step is performed for each occupied buffer line (X', Y', Z') and whereby, in each process step, containers 1 are taken from only one buffer line (X', Y', Z') or are assembled in a single process step, whereby the containers 1 that form a mixed package are taken simultaneously from a plurality of buffer lines (X', Y', Z').

Still another feature or aspect of an embodiment is believed at the time of the filing of this patent application to possibly reside broadly in a method characterized in that one mixed package 19 is completely set up per process step and setup line 17.

A further feature or aspect of an embodiment is believed at the time of the filing of this patent application to possibly reside broadly in a method characterized in that at least one mixed package 19 is set up per setup line 17 in a plurality of process steps.

Another feature or aspect of an embodiment is believed at the time of the filing of this patent application to possibly reside broadly in a method characterized in that the mixed packages 19 formed are compressed after assembly and transported to a packer.

Yet another feature or aspect of an embodiment is believed at the time of the filing of this patent application to possibly reside broadly in a method characterized in that the containers 1 located on the buffer lines (X', Y', Z') are compressed after their removal from packages.

Still another feature or aspect of an embodiment is believed at the time of the filing of this patent application to possibly reside broadly in a method characterized in that the outer packaging 1 of the single-variety packages 13 is used to form the mixed packages 19.

A further feature or aspect of an embodiment is believed at the time of the filing of this patent application to possibly reside broadly in a method characterized in that the packaging units 2 are removed as an entire group from the outside packaging 3 of the single-variety packages 4.

Another feature or aspect of an embodiment is believed at the time of the filing of this patent application to possibly reside broadly in a device for the formation of mixed packages 19 from single-variety packages 13, each with containers 1 or similar packaging units contained in an external package 14, whereby the single-variety packages 13 are transported by means of at least one conveyor (X, Y, Z) to an unpacker, and whereby preferably those packages 13 which contain only one and the same product are located on each conveyor (X, Y, Z), and whereby after the unpacking, the containers 1 are located on at least one buffer line (X', Y', Z') and are then assembled into mixed packages 19, characterized in that the device has a packing head 18 that comprises at least one module, which packing head 18 is realized so that it removes containers 1 for at least one mixed package 19 simultaneously from a plurality of buffer lines (X', Y', Z') in a single process step, or that it assembles the containers 1 for at least [one] mixed container 19 in a plurality of process steps, whereby in each process step only containers 1 of one variety are removed or set up.

Yet another feature or aspect of an embodiment is believed at the time of the filing of this patent application to possibly reside broadly in a device characterized in that the packing head 18 and/or each individual module of the packing head 18 can be rotated around its vertical axis.

One feature or aspect of an embodiment is believed at the time of the filing of this patent application to possibly reside broadly in a device characterized in that the receptacles for the containers 1 located in the individual modules of the packing head 18 can be moved from a first position into at least one second position in which the receptacles are at a greater distance from one another.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that any or all the examples of patents, published patent applications, and other documents which are included in this application and including those which are referred to in paragraphs which state "Some examples of . . . which may possibly be used in at least one possible embodiment of the present application . . . " may possibly not be used or useable in any one or more or any embodiments of the application.

The sentence immediately above relates to patents, published patent applications and other documents either incorporated by reference or not incorporated by reference.

All of the patents, patent applications or patent publications, which were cited in the International Search Report dated Oct. 20, 2006, and/or cited elsewhere are hereby incorporated by reference as if set forth in their entirety herein as follows: DE 44 33 361 A1; U.S. Pat. No. 4,164,296 A; and EP 0 239 547 A.

The corresponding foreign and international patent publication applications, namely, Federal Republic of Germany Patent Application No. 10 2005 039 842.1, filed on Aug. 23, 2005, having inventor Werner HAGENBROCK and Joachim JUNGHANS, and DE-OS 10 2005 039 842.1 and DE-PS 10 2005 039 842.1, and International Application No. PCT/EP2006/008270, filed on Aug. 23, 2006, having WIPO Publication No. WO2007/022963 and inventors Werner HAGENBROCK and Joachim JUNGHANS, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method for formation of mixed packages of containers, in which at least one container contains a product different from a product contained in at least one other container, from single-variety packages of containers, in which each of the containers contains same product, said method comprising:

moving said single-variety packages containing groups of containers to an unpacking area;

unpacking containers from said single-variety packages;

moving unpacked containers to a storing area;

storing unpacked containers in lines, wherein the containers in each of said lines contain one type of product, and wherein the containers in at least one of said lines contain products of a type different from products contained in the containers in at least one other of said lines; and one of (A) and (B):

(A) removing at least one stored container containing a first type of product and substantially simultaneously removing at least one other stored container containing a second type of product different from the first type of product, and transporting the removed containers to a setup section to form mixed packages of containers; and (B) removing at least one stored container containing a first type of product and transporting the removed containers containing the first type of product to a setup section, and then subsequently removing at least one other stored container containing a second type of product different from the first type of product and transporting the removed containers containing the second type of product to a setup section to form mixed packages of containers.

2. The method according to claim 1, wherein:

said step of moving said single-variety packages containing groups of containers to an unpacking area comprises moving said single-variety packages on at least one conveyor;

said step of unpacking containers from said single-variety packages comprises unpacking the containers from the packaging of said single-variety packages with an unpacking machine said step of storing unpacked containers in lines comprises storing unpacked containers in a plurality of buffer lines; and said step (A) comprises activating a packing head and removing, with said packing head, at least one stored container containing a first type of product from a first buffer line, and substantially simultaneously removing, with said packing head, at least one other stored container containing a second type of product different from the first type of product from a second buffer line, and transporting, with said packing head, the removed containers to said setup section to form mixed packages of containers; and said step (B) comprises activating said packing head and removing, with said packing head, at least one stored container containing a first type of product from said first buffer line and transporting, with said packing head, the removed containers containing the first type of product to said setup section, and then removing, with said packing head, at least one other stored container containing a second type of product different from the first type of product from said second buffer line and transporting, with said packing head, the removed containers containing the second type of product to said setup section to form mixed packages of containers.

3. The method according to claim 2, wherein said step of activating said packing head comprises removing containers with said packing head substantially simultaneously from at least two of said plurality of buffer lines and forming one mixed package completely in a single step on a setup line of said setup section.

4. The method according to claim 3, wherein said step of forming one mixed package comprises compacting the containers together in said setup section and transporting the containers to a packing machine.

5. The method according to claim 4, wherein:

said step of moving unpacked containers from said unpacking machine into said plurality of buffer lines further comprises compacting the containers together on the buffer lines after their removal from packages; and said method further comprises the step of moving remaining containers together on said buffer lines subsequent to removal of containers by said packing head.

6. The method according to claim 5, wherein said step of unpacking containers with said unpacking machine from said single-variety packages further comprises:

removing the containers as an entire group from the packaging; and transporting the packaging to the packing machine to be used in packing the mixed packages.

7. The method according to claim 6, wherein said containers comprise beverage containers containing a liquid beverage.

8. The method according to claim 2, wherein said step of activating the packing head comprises removing containers with said packing head from said plurality of buffer lines, one buffer line at a time in a plurality of steps until one mixed package is formed on a setup line of the setup section.

9. The method according to claim 8, wherein said step of forming one mixed package comprises compacting the containers together in said setup section and transporting the containers to a packing machine.

10. The method according to claim 9, wherein:

said step of moving unpacked containers from said unpacking machine into said plurality of buffer lines further comprises compacting the containers together on the buffer lines after their removal from packages; and said method further comprises the step of moving remaining containers together on said buffer lines subsequent to removal of containers by said packing head.

11. The method according to claim 10, wherein said step of unpacking containers with said unpacking machine from said single-variety packages further comprises:

removing the containers as an entire group from the packaging; and transporting the packaging to the packing machine to be used in packing the mixed packages.

12. The method according to claim 11, wherein said containers comprise beverage containers containing a liquid beverage.

13. A method of forming mixed packages comprising at least one container containing a first type of product and at least one container containing a second type of product different from said first type of product, said method comprising the steps of:

moving a first plurality of single-variety packages comprising containers containing said first type of product to an unpacking area, and moving a second plurality of single-variety packages comprising containers containing said second type of product to said unpacking area;

unpacking containers from said single-variety packages;

moving unpacked containers to a storing area;

storing unpacked containers containing said first type of product in a first line, and storing unpacked containers containing said second type of product in a second line;

one of (A) and (B):

(A) removing at least one container containing said first type of product from said first line of containers and substantially simultaneously removing at least one container containing said second type of product from said second line of containers, and transporting the removed containers to a setup section; and (B) removing at least one container containing said first type of product from said first line of containers and transporting said at least one container containing said first type of product to a setup section, and then subsequently removing at least one container containing said second type of product from said second line of containers and transporting said at least one container containing said second type of product to a setup section; and forming containers in said setup section into mixed packages comprising at least one container containing said first type of product and at least one container containing said second type of product.

14. The method according to claim 13, wherein said step of forming containers in said setup section into mixed packages comprises compacting the containers together in said setup section and transporting the containers to a packing machine.

15. The method according to claim 14, wherein said step of unpacking containers with said unpacking machine from said single-variety packages further comprises:
   removing the containers as an entire group from the packaging; and
   transporting the packaging to the packing machine to be used in packing the mixed packages.

16. The method according to claim 15, wherein:
   said step of moving said single-variety packages containing groups of containers to an unpacking area comprises moving said single-variety packages on at least one conveyor;
   said step of unpacking containers from said single-variety packages comprises unpacking the containers from the packaging of said single-variety packages with an unpacking machine; and
   said step of storing unpacked containers in lines comprises storing unpacked containers in a plurality of buffer lines.

17. The method according to claim 16, wherein:
   said step (A) comprises activating a packing head and removing, with said packing head, at least one container containing said first type of product from a first buffer line, and substantially simultaneously removing, with said packing head, at least one other container containing said second type of product different from a second buffer line, and transporting, with said packing head, the removed containers to said setup section;
   said step (B) comprises activating said packing head and removing, with said packing head, at least one container containing said first type of product from said first buffer line and transporting, with said packing head, the removed containers containing the first type of product to said setup section, and then removing, with said packing head, at least one container containing a second type of product said from said second buffer line and transporting, with said packing head, the removed containers containing said second type of product to said setup section;
   said step of moving unpacked containers from said unpacking machine into said plurality of buffer lines further comprises compacting the containers together on the buffer lines after their removal from packages; and
   said method further comprises the step of moving remaining containers together on said buffer lines subsequent to removal of containers by said packing head.

18. The method according to claim 17, wherein:
   said method further comprises the steps of:
      moving a third plurality of single-variety packages comprising containers containing a third type of product different from said first and second types of products to said unpacking area;
      unpacking containers from said single-variety packages;
      moving unpacked containers to a storing area; and
      storing unpacked containers containing said third type of product in a third line;
   step (A) further comprises removing at least one container containing said third type of product from said third line of containers substantially simultaneously to removing said at least one container containing said first type of product from said first line of containers and removing said at least one container containing said second type of product from said second line of containers, and transporting the removed containers to said setup section; and
   step (B) further comprises removing at least one container containing said third type of product from said third line of containers and transporting said at least one container containing said third type of product to said setup section subsequent to transporting said at least one container containing said second type of product to said setup section; and
   forming containers in said setup section into mixed packages comprising at least one container containing said first type of product, at least one container containing said second type of product, and at least one container containing said third type of product.

19. The method according to claim 18, wherein said step of activating said packing head comprises removing containers with said packing head substantially simultaneously from at least two of said plurality of buffer lines and forming one mixed package completely in a single step on a setup line of said setup section.

20. The method according to claim 18, wherein said step of activating the packing head comprises removing containers with said packing head from said plurality of buffer lines, one buffer line at a time, in a plurality of steps until one mixed package is formed on a setup line of the setup section.

* * * * *